United States Patent
Hillan et al.

(10) Patent No.: US 9,800,693 B2
(45) Date of Patent: Oct. 24, 2017

(54) SYSTEMS AND METHODS FOR AN INDUCTIVE COMMUNICATION INTERFACE

(71) Applicant: QUALCOMM Incorporated, San Diego, CA (US)

(72) Inventors: John Hillan, Farnborough (GB); Dubai Chingalande, Farnborough (GB); Alan Gillespie, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 14/466,129

(22) Filed: Aug. 22, 2014

(65) Prior Publication Data
US 2015/0215435 A1 Jul. 30, 2015

Related U.S. Application Data

(60) Provisional application No. 61/932,434, filed on Jan. 28, 2014.

(51) Int. Cl.
*H04B 7/00* (2006.01)
*H04L 29/06* (2006.01)
*H04W 4/00* (2009.01)
*H04B 5/00* (2006.01)

(52) U.S. Cl.
CPC ........... *H04L 69/08* (2013.01); *H04B 5/0025* (2013.01); *H04W 4/008* (2013.01)

(58) Field of Classification Search
CPC ....................................................... H04B 5/02
USPC ...................................... 455/41.1, 41.2, 41.3
See application file for complete search history.

(56) References Cited

U.S. PATENT DOCUMENTS

| 8,342,415 B2* | 1/2013 | Soh | G06K 7/10237 235/451 |
|---|---|---|---|
| 2012/0135693 A1* | 5/2012 | Teruyama | H04W 4/20 455/68 |
| 2012/0320763 A1* | 12/2012 | Hong | H04B 5/0081 370/246 |
| 2013/0267167 A1* | 10/2013 | Hillan | H04W 28/22 455/41.1 |
| 2013/0344804 A1* | 12/2013 | Chen | H04B 5/02 455/41.1 |

(Continued)

OTHER PUBLICATIONS

"Simple NDEF Exchange Protocol—Technical Specification, SNEP 1.0", Aug. 31, 2011 (Aug. 31, 2011), pp. 1-20, XP055081363, Wakefield, MA, USA 01880, Retrieved from the Internet: URL:http://www.jortec.neec-fct.org/wp-content/uploads/2013/02/Simple_NDEF_Exchange_Protocol.pdf [retrieved on Sep. 27, 2013] section 2.1.

(Continued)

*Primary Examiner* — April G Gonzales
(74) *Attorney, Agent, or Firm* — Austin Rapp & Hardman, P.C.

(57) ABSTRACT

A method is described. The method includes enabling and configuring poll mode for a near field communication (NFC) data exchange format (NDEF) radio frequency (RF) interface configuration. The method also includes determining that a remote NFC endpoint includes an NFC forum tag once an NFC controller (NFCC) has successfully completed protocol activation. The method further includes performing activation operations based on an RF protocol of the NFC forum tag.

53 Claims, 11 Drawing Sheets

(56) References Cited

U.S. PATENT DOCUMENTS

| | | | |
|---|---|---|---|
| 2014/0106671 A1* | 4/2014 | Hillan | H04B 5/02 455/41.1 |
| 2014/0208121 A1* | 7/2014 | Arunan | H04L 9/3247 713/176 |
| 2014/0213183 A1* | 7/2014 | Reddy Badvel | G06Q 10/00 455/41.1 |

OTHER PUBLICATIONS

International Search Report and Written Opinion—PCT/US2015/011920—ISA/EPO—Apr. 8, 2014.

NCI Forum: "NFC Controller Interface (NCI) Specification", Nov. 6, 2012 (Nov. 6, 2012), XP055088823, pp. 1-146, Retrieved from the Internet: URL:http://www.cardsys.dk/download/NFC_Docs/ NFC Controller Interface (NCI) Technical Specification.pdf [retrieved on Nov. 18, 2013].

"NFC Forum Device Requirements, High Level Conformance Requirements Revision V1.0", Jan. 26, 2010 (Jan. 26, 2010), XP055065535, Retrieved from the Internet: URL:http://certification.nfc-forum.org/docs/NFC Forum Device Requirements.pdf, pp. 8,9,14-pp. 16,18,19.

NFC Forum TM, "NFC Data Exchange Format (NDEF) Technical Specification NFC Forum", [Online] Jul. 24, 2006 (Jul. 24, 2006), XP0055170882, pp. 1-25, Retrieved from the Internet: URL:http://members.nfc-forum.org/specs/nc_spec_license/survey_form/process> pp. 7-8.

NFC Forum: "Type 1 Tag Operation Specification", Apr. 13, 2011 (Apr. 13, 2011), XP055179900, pp. 1-48, Retrieved from the Internet: URL:http://members.nfc-forum.org/specs/nc_spec_license/survey_form/process [retrieved on Mar. 27, 2015].

\* cited by examiner

SYSTEMS AND METHODS FOR AN INDUCTIVE COMMUNICATION INTERFACE

RELATED APPLICATIONS

This application is related to and claims priority from U.S. Provisional Patent Application Ser. No. 61/932,434, filed Jan. 28, 2014, for "Methods and Apparatus for an RF Interface for the NFC Forum Controller Interface That Provides Access to NDEF on an NFC Forum Tag."

TECHNICAL FIELD

The present disclosure relates generally to wireless communications. More specifically, the present disclosure relates to the behaviors and mechanisms for implementing an RF interface stack partition within the NFC Forum Controller Interface (NCI).

BACKGROUND

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight and can be easily carried by users. More specifically, the portable wireless telephones, for example, further include cellular telephones that communicate voice and data packets over wireless networks. Many such cellular telephones are being manufactured with relatively large increases in computing capabilities and as such, are becoming tantamount to small personal computers and hand-held PDAs. Further, such devices are being manufactured to enable communications using a variety of frequencies and applicable coverage areas such as cellular communications, wireless local area network (WLAN) communications, near field communication (NFC), etc.

When NFC is implemented, an NFC enabled device may initially detect an NFC tag and/or target device. Thereafter, communications between NFC devices may use an NFC data exchange protocol (DEP). The present NFC Forum specifications provide for communications between devices using a number of stack partitions (known as RF Interfaces). Benefits may be realized by providing a set of behaviors and a mechanism for implementing one particular RF interface referred to as the NFC Data Exchange Format (NDEF) radio frequency (RF) Interface.

SUMMARY

A method is described. The method includes enabling and configuring poll mode for a near field communication (NFC) data exchange format (NDEF) radio frequency (RF) interface configuration. The method also includes determining that a remote NFC endpoint includes an NFC forum tag once an NFC controller (NFCC) has successfully completed protocol activation. The method further includes performing activation operations based on an RF protocol of the NFC forum tag.

A device host (DH) may send an RF_DISCOVER_CMD message to the NFCC to enable poll mode for the NDEF RF interface. The RF_DISCOVER_CMD message may include configurations with RF technology and mode values of at least one of NFC_A_PASSIVE_POLL_MODE, NFC_B_PASSIVE_POLL_MODE, and NFC_F_PASSIVE_POLL_MODE.

If the RF protocol of the NFC forum tag is PROTOCOL_T1T, then performing activation operations may include identifying the NFC forum tag as an NFC forum type 1 tag. Version treatment may be performed. The presence of an NDEF message in the NFC forum tag may also be confirmed.

If the RF protocol of the NFC forum tag is PROTOCOL_T2T, then performing activation operations may include performing version treatment. An NDEF detection procedure may also be performed.

If the RF protocol of the NFC forum tag is PROTOCOL_T3T, then performing activation operations may include performing version treatment. NDEF detection may also be performed.

If the RF protocol of the NFC forum tag is PROTOCOL_T4T, then performing activation operations may include performing version treatment. An NDEF detection procedure may also be performed.

The method may also include detecting the presence of an NDEF message on the remote NFC endpoint. An RF_INTF_ACTIVATED_NTF message may be sent to a device host (DH) with activation parameters. A current state of the NFC forum tag may be determined based on the NDEF message length and the NFC forum tag attributes when the DH receives the RF_INTF_ACTIVATED_NTF message.

The method may also include retrieving a complete NDEF message from an NFC forum tag based on an NDEF get command. The method may further include storing a complete NDEF message on an NFC forum tag based on an NDEF put command. The method may additionally include changing read access for an NDEF message on the remote NFC endpoint based on an NDEF read access command.

The method may also include changing write access for an NDEF message on the remote NFC endpoint based on an NDEF write access command. The method may further include refraining from using the NDEF RF interface when the presence of an NDEF message is not detected on the remote NFC endpoint. The DH may elect to use one of an ISO-DEP RF interface, an aggregated frame RF interface and a frame RF interface.

The method may also include sending an NFC forum controller interface (NCI) data message with a descriptor field set to the value of NDEF_OPERATION_INVALID and no parameters when the NFCC receives an NCI data message that does not conform to format requirements.

The method may also include sending an NCI data message with a descriptor field set to the value of NDEF_OPERATION_DISALLOWED and no parameters when an NDEF operation fails and the NFCC is able to determine that the failure is because the NDEF operation is not allowed given the current state of the NFC forum tag.

The method may also include sending an NCI data message with the descriptor field set to the value NDEF_OPERATION_OVERFLOW and no parameters when an NDEF put operation fails and the NFCC is able to determine that the failure is due to not enough space on the NFC forum tag.

The method may also include sending an NCI data message with the descriptor field set to the value NDEF_OPERATION_FAILED and no parameters when an NDEF operation fails and the NFCC is unable to determine a reason for the failure.

When the NFCC detects at least one of a transmission error, a protocol error and a timeout error, the NFCC may retransmit the last command subject to a configured retry limit.

The method may also include instructing the NFCC to read an existing NDEF message from the NFC forum tag. The method may further include instructing the NFCC to write a new NDEF message to the NFC forum tag.

The method may be performed by an electronic device comprising NFC functionality. The electronic device may include a device host (DH). The DH may recognize at least one of an NFC target device and an NFC tag when within range of a coverage area for NFC communication.

The NDEF RF interface may define linkage of operations to the NFC forum type 1-4 tag operation specifications to perform transfers. The NDEF RF interface may also define mechanisms by which access control for an NDEF message on the remote NFC endpoint can be changed. The NDEF RF interface may further define a number of error scenarios and responses to these error scenarios.

An apparatus is also described. The apparatus includes a processor, memory in electronic communication with the processor and instructions stored in the memory. The instructions are executable by the processor to enable and configure poll mode for an NDEF RF interface configuration. The instructions are also executable to determine that a remote NFC endpoint includes an NFC forum tag once an NFCC has successfully completed protocol activation. The instructions are further executable to perform activation operations based on an RF protocol of the NFC forum tag.

An electronic device is also described. The electronic device includes means for enabling and configuring poll mode for an NDEF RF interface configuration. The electronic device also includes means for determining that a remote NFC endpoint includes an NFC forum tag once an NFCC has successfully completed protocol activation. The electronic device further includes means for performing activation operations based on an RF protocol of the NFC forum tag.

A computer-program product is also described. The computer-program product includes a non-transitory tangible computer-readable medium having instructions thereon. The instructions include code for causing an electronic device to enable and configure poll mode for an NDEF RF interface configuration. The instructions also include code for causing the electronic device to determine that a remote NFC endpoint includes an NFC forum tag once an NFCC has successfully completed protocol activation. The instructions further include code for causing the electronic device to perform activation operations based on an RF protocol of the NFC forum tag.

DETAILED DESCRIPTION

It should be noted that some communication devices may communicate wirelessly and/or may communicate using a wired connection or link. For example, some communication devices may communicate with other devices using an Ethernet protocol. The systems and methods disclosed herein may be applied to communication devices that communicate wirelessly and/or that communicate using a wired connection or link. In one configuration, the systems and methods disclosed herein may be applied to a communication device that communicates with another device using near-field communication (NFC).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

As described herein, an electronic device may recognize an NFC target device and/or tag when within range of the coverage area of the NFC device and/or tag. The term "NFC tag" or "NFC Forum tag" refers to an integrated circuit that provides NFC functionality. After an NFC target device and/or tag have been located, the device may obtain sufficient information to establish communications. One form of communications that may be established is a communication link to a tag that supports one of the NFC Forum-defined tag platforms, and in particular, that includes at least one NFC Data Exchange Format (NDEF) message. Communications between the devices may be enabled over a variety of NFC RF technologies, such as but not limited to, NFC-A, NFC-B, NFC-F, etc.

Generally, a device host (DH) may be operable in an environment that is not substantially limited by memory constraints while also potentially operating with comparatively higher power consumption. By contrast, an NFC controller (NFCC) may be operable in a memory-limited environment while consuming comparatively less power.

Figure 1:
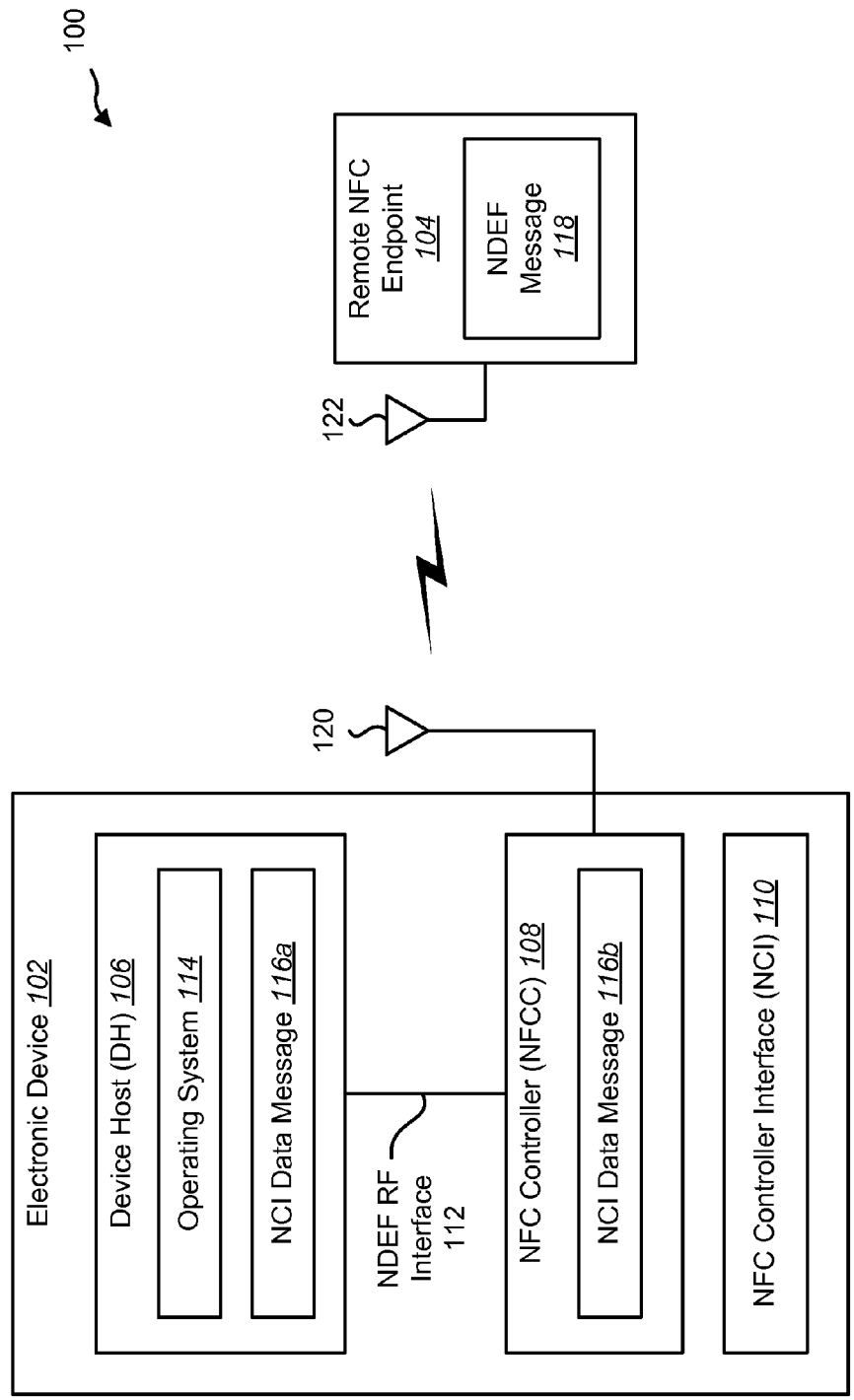
FIG. 1 is a block diagram illustrating one configuration of a communication network.

FIG. 1 is a block diagram illustrating one configuration of a communication network 100. The communication network 100 may include one or more electronic devices 102. An electronic device 102 may be in communication with a remote NFC endpoint 104. The electronic device 102 may communicate with the remote NFC endpoint 104 using inductive communication. For example, the antenna 120 of electronic device 102 may produce a radiated field (e.g., a magnetic field) that is received by the antenna 122 of the remote NFC endpoint. In one configuration, the electronic device 102 may use one or more NFC technologies (e.g., NFC-A, NFC-B and NFC-F) to communicate with the remote NFC endpoint 104.

In one configuration, the remote NFC endpoint 104 may be operable to communicate using NFC through various interfaces, such as a frame RF interface, ISO-DEP RF interface and NFC-DEP RF interface. In another configuration, the electronic device 102 and remote NFC endpoint 104 may establish an NFC-DEP RF protocol based communication link with link layer connections defined through a logical link control protocol (LLCP). In still another configuration, the electronic device 102 may be operable to be connected to an access network and/or core network (e.g., a CDMA network, a GPRS network, a UMTS network, and other types of wireline and wireless communication networks).

The electronic device 102 that is the reader/writer may use a relevant tag operation protocol to talk to a remote NFC endpoint 104 that implements a given tag platform. There are at present four distinct NFC Forum tag types. "Type 1/2/3/4 Tag Operation" describes operations in the reader/writer. "Type 1/2/3/4 Tag Platform" describes operations in the remote device. The term "NFC Forum Tag" refers to a device that implements at least one of the four defined tag platforms. One key aspect of the systems and methods described herein is the linkage provided between the NFC controller interface (NCI) 110 specification and the four tag operation specifications.

The electronic device 102 may include an NFC controller (NFCC) 108, an NCI 110 and a device host (DH) 106. The device host (DH) 106 may generally perform operations on the electronic device 102. One example of the device host (DH) 106 includes a processor and memory, where the processor runs an operating system (OS) 114. Examples of operating systems 114 that may be run by the device host (DH) 106 include Android, iOS, Windows Phone, Windows RT and Blackberry.

The device host (DH) 106 may be operable to obtain, through the NCI 110 and the NFC controller (NFCC) 108, information from the remote NFC endpoint 104. During communication using one of the four defined tag operation protocols, the device host (DH) 106 may operate using the NDEF RF interface 112.

The NDEF RF interface 112 defines procedures for activation and deactivation of the NFC protocol, as well as message payload formats to enable read and write access to the NDEF on a remote NFC Forum tag. The NDEF RF interface 112 also defines the linkage of these operations to the NFC Forum Type 1-4 tag operation specifications to perform transfers. Furthermore, the NDEF RF interface 112 defines mechanisms by which the access control for the NDEF message 118 on the remote tag (e.g., the remote NFC endpoint 104) can be changed. Finally, the NDEF RF interface 112 defines a number of possible error scenarios and responses to these errors.

The NDEF RF interface 112 may provide for interaction between an NFC Forum device and an NFC Forum tag. For example, the NDEF RF interface 112 may enable the DH 106 to read and write a complete NDEF message 118 in byte form. A discovery process may provide the DH 106 with sufficient information to determine the current life cycle of the tag. If allowed, the DH 106 may instruct the NFCC 108 to read an existing NDEF message 118 from the tag or to write a new NDEF message 118 to the tag. The DH 106 may also change the state of the tag by updating the read and write access.

For a Type 1 tag or a Type 2 tag, the NFCC 108 may use the procedures defined in Type 1 tag operation (T1TOP) or Type 2 tag operation (T2TOP) technical specifications from the NFC Forum to interact with capability container bytes and an NDEF message 118 type-length-value (TLV) on the remote NFC endpoint 104. For a Type 3 tag, the NFCC 108 may use the procedures defined in the Type 3 tag operation (T3TOP) specifications to interact with an attribute information block and blocks assigned for the NDEF storage on the remote NFC endpoint 104. For a Type 4 tag, the NFCC 108 may use the procedures defined in the Type 4 tag operation (T4TOP) specifications to interact with the capability container file and the NDEF file on the remote NFC endpoint 104. It should be noted that the NDEF RF interface 112 may not be applicable to the listen side (and is thus only applicable to the poll side). The following RF protocols can be mapped to the NDEF RF interface 112 in poll mode: PROTOCOL_T1T, PROTOCOL_T2T, PROTOCOL_T3T and PROTOCOL_ISO_DEP.

When the NDEF RF interface 112 is used, data messages exchanged over the static RF connection may be used to manage tag operations and to provide the resultant information and status. The payload of a data message may include a descriptor field, a length field and an information field. Table 1 below provides additional information on the data message payload format. Table 2 provides the NDEF access command values and Table 3 provides the NDEF access status values.

TABLE 1

| Payload Field(s) | Length | Value/Description |
|---|---|---|
| Descriptor | 1 Octet | In the direction from DH to NFCC, the NDEF access command. This field SHALL contain one of the NDEF access command values defined in Table 2.<br>In the direction from NFCC to DH, the NDEF access status. This field SHALL contain one of the NDEF access status values defined in Table 3. |
| Length | 0 or 2 Octets | If the command or status value in the Descriptor field has one or more parameters, the Length field SHALL be 2 octets, representing a 16-bit unsigned integer that specifies the total length in octets of the Information field. Transmission order SHALL be most significant octet first.<br>Otherwise, the Length field SHALL not be present. |
| Information | n Octets | If the command or status value in the Descriptor field has one or more parameters, the Information field SHALL contain the parameters in the order defined for the value of the Descriptor field. The Information field is omitted if the value of the Length field is zero.<br>For command or status values that do not have parameters, the Information field SHALL not be present. |

TABLE 2

| NDEF access command value | Definition |
|---|---|
| 0x00 | NDEF_OPERATION_GET |
| 0x01 | NDEF_OPERATION_PUT |
| 0x02 | NDEF_OPERATION_READ_ACCESS |
| 0x03 | NDEF_OPERATION_WRITE_ACCESS |
| 0x04-0xFF | Reserved for Future Use |

TABLE 3

| NDEF access status value | Definition |
| --- | --- |
| 0x00 | NDEF_OPERATION_SUCCEEDED |
| 0x01 | NDEF_OPERATION_INVALID |
| 0x02 | NDEF_OPERATION_FAILED |
| 0x03 | NDEF_OPERATION_DISALLOWED |
| 0x04 | NDEF_OPERATION_OVERFLOW |
| 0x05-0xFF | Reserved for Future Use |

The NDEF get command may be used to retrieve a complete NDEF message 118 from an NFC forum tag. The DH 106 may send an NDEF get command if it is determined that the operation is allowed by the current stage of the tag. To perform an NDEF get command, the DH 106 may send an NCI data message 116*a* with the descriptor field set to the value NDEF_OPERATION_GET and with no parameters.

When the NFCC 108 receives a valid NDEF get command, the NFCC 108 may use the procedures defined in the appropriate tag operation specification to read the NDEF message 118 TLV, block or file. For example, if the remote NFC endpoint 104 is a type 1 tag, the NFCC 108 may read the NDEF message 118 (as defined in [T1TOP]). If the remote NFC endpoint 104 is a type 2 tag, the NFCC 108 may perform an NDEF read procedure as defined in [T2TOP]. If the remote NFC endpoint 104 is a type 3 tag, the NFCC 108 may read the NDEF message 118 (as defined in [T3TOP]). If the remote NFC endpoint 104 is a type 4 tag, the NFCC 108 may perform an NDEF read procedure as defined in [T4TOP].)

The NFCC 108 may not need to check that the NDEF message 118 from the tag is well-formed. As used herein, "well-formed" means compliant to the NDEF Message as defined in the NDEF technical specification from the NFC Forum. Instead, it may be the responsibility of the DH 106 to check and interpret the NDEF message 118. If the NDEF get procedure completes successfully, the NFCC 108 may send an NCI data message 116*b* with the descriptor field set to the value of NDEF_OPERATION_SUCCEEDED, followed by a single parameter that represents the complete NDEF message 118 from the tag as a sequence of bytes.

The NDEF put command may be used to store a complete NDEF message 118 on an NFC forum tag. The DH 106 may send an NDEF Put command if it is determined that the operation is allowed by the current state of the tag. In one configuration, to perform an NDEF Put command, the DH 106 may send an NCI data message 116*a* with the descriptor field set to the value NDEF_OPERATION_PUT, followed by a single parameter that represents the complete NDEF message 118 as a sequence of bytes. The NFCC 108 may not need to check that the NDEF message 118 from the DH 106 is well-formed. Instead, it is the responsibility of the DH 106 to ensure that the NDEF message 118 is valid.

When the NFCC 108 receives a valid NDEF Put command, the NFCC 108 may use the procedures defined in the appropriate tag operation specification to update the NDEF message 118 TLV, block or file. For example, if the remote NFC endpoint 104 is a Type 1 tag, the NFCC 108 may perform the NDEF storage operations as defined in [T1TOP]. If the remote NFC endpoint 104 is a Type 2 tag, then the NFCC 108 may perform the NDEF write procedure operations as defined in [T2TOP]. If the remote NFC endpoint 104 is a Type 3 tag, then the NFCC 108 may perform the write NDEF message 118 operations as defined in [T3TOP]. If the Remote NFC endpoint 104 is a Type 4 tag, then the NFCC 108 may perform the NDEF update procedure operations as defined in [T4TOP].

The NFCC 108 may leave all other TLVs, blocks or files on the NFC Forum tag unchanged. For a Type 1 tag or Type 2 tag, the NFCC 108 may refrain from changing the order of any of the TLVs. If the NDEF Put command completes successfully, the NFCC 108 may send an NCI data message 116*b* with the descriptor field set to the value NDEF_OPERATION_SUCCEEDED and no parameters. On receiving this data message, the DH 106 may determine the current state of the tag, if the tag has changed.

The NDEF read access procedure may be used to change the read access for the NDEF message 118 on the remote NFC endpoint 104. The DH 106 may send an NDEF read access command if it is determined that the operation is allowed by the current state of the tag. To perform an NDEF read access procedure, the DH 106 may send an NCI data message 116*a* with the descriptor field set to the value NDEF_OPERATION_READ_ACCESS, followed by a single one-byte parameter that includes the new read access capability. In one configuration, the NFCC 108 does not need to check the new read access capability from the DH 106. Instead, it is the responsibility of the DH 106 to ensure that it is valid.

If the remote NFC endpoint 104 is a Type 1 tag, then the NFCC 108 may use Type 1 tag commands to replace the most significant nibble of byte 3 of the capability container, as defined in [T1TOP], with the 4 least significant bits of the value of the parameter byte. If the remote NFC endpoint 104 is a Type 2 Tag, then the NFCC 108 may use Type 2 tag commands to replace the most significant nibble of byte 3 of the capability container, as defined in [T2TOP], with the 4 least significant bits of the value of the parameter byte. If the remote NFC endpoint 104 is a Type 3 tag, NDEF read access may not be allowed. If the remote NFC endpoint 104 is a Type 4 tag, then the NFCC 108 may use Type 4 tag commands to replace an NDEF file read access condition byte of the NDEF file control TLV, as defined in [T4TOP], with the value of the parameter byte.

If the NDEF read access procedure completes successfully, the NFCC 108 may send an NCI data message 116*b* with the descriptor field set to the value NDEF_OPERATION_SUCCEEDED, and no parameters. On receiving this data message, the DH 106 may determine the current state of the tag, if it has changed.

The NDEF write access procedure may be used to change the write access for the NDEF message 118 on the remote NFC endpoint 104. The DH 106 may send an NDEF write access command if it is determined that the operation is allowed by the current state of the tag. To perform an NDEF write access procedure, the DH 106 may send an NCI data message 116*a* with the descriptor field set to the value NDEF_OPERATION_WRITE_ACCESS, followed by a single one-byte parameter that includes the new write access capability. The NFCC 108 does not need to check the new write access capability from the DH 106. Instead, it is the responsibility of the DH 106 to ensure that it is valid.

If the remote NFC endpoint 104 is a Type 1 tag, then the NFCC 108 may use Type 1 tag commands to replace the least significant nibble of byte 3 of the capability container, as defined in [T1TOP], with the 4 least significant bits of the value of the parameter byte. If the remote NFC endpoint 104 is a Type 2 tag, then the NFCC 108 may use Type 2 tag commands to replace the least significant nibble of byte 3 of the capability container, as defined in [T2TOP], with the 4 least significant bits of the value of the parameter byte. If the remote NFC endpoint 104 is a Type 3 tag, then NDEF write access is not allowed. If the remote NFC endpoint 104 is a Type 4 tag, then the NFCC 108 may use Type 4 tag commands to replace the NDEF File write access condition byte of the NDEF file control TLV, as defined in [T4TOP], with the value of the parameter byte.

If the NDEF write access procedure completes successfully, the NFCC 108 may send an NCI data message 116b with the descriptor field set to the value NDEF_OPERATION_SUCCEEDED, and no parameters. On receiving this NCI data message 116b, the DH 106 may determine the current state of the tag, if it has changed.

The DH 106 can control certain aspects of the NDEF RF interface 112 using the configuration parameter NDEF_INTF_CONFIG. The configuration parameter NDEF_INTF_CONFIG is defined below in Table 4 and values for NDEF_INTF_CONFIG are given in Table 5.

TABLE 4

| ID | Length | Value | Description |
| --- | --- | --- | --- |
| NDEF_INTF_CONFIG | 2 Octets | See Table 5 Default 0x00, 0x00 | |

TABLE 5

| | Bit Mask | | | | | | | |
| --- | --- | --- | --- | --- | --- | --- | --- | --- |
| | b7 | b6 | b5 | b4 | b3 | b2 | b1 | b0 | Description |
| Octet 0 | 0 | 0 | 0 | 0 | | | | | Reserved for Future Use |
| | | 0 | | | | | | | Reserved for Future Use |
| | | | | | | X | X | X | Retry Count (0-7) |
| Octet 1 | 0 | 0 | 0 | 0 | 0 | 0 | 0 | 0 | Reserved for Future Use |

The retry count applies to each RF Frame associated with a protocol-specific command or response. If the retry count is equal to 0, the NFCC 108 may refrain from trying to retransmit any RF frames for which the NFCC 108 detects an error. Otherwise, the NFCC 108 may attempt to retry up to a certain number of times (as indicated by a retry count, for example).

Another NDEF RF interface 112 specific control message is NDEF abort. The DH 106 may only send the NDEF abort command RF_NDEF_ABORT_CMD in when the NDEF RF interface 112 is in the state RFST_POLL_ACTIVE. The parameters for an NDEF abort command are given below in Table 6.

TABLE 6

| Payload Field(s) | Length | Value/Description |
| --- | --- | --- |
| RF_NDEF_ABORT_CMD | | |
| Empty payload | | |
| RF_NDEF_ABORT_RSP | | |
| Status | 1 Octet | See NCI Table 108 |

Upon receiving the RF_NDEF_ABORT_CMD, the NFCC 108 may refrain from sending any further commands to the remote NFC endpoint 104. Instead, the NFCC 108 may wait for a response to the current command, if already sent. The NFCC 108 may discard any data read from the tag before sending the RF_NDEF_ABORT_RSP. To maintain the NCI 110 flow control mechanism, if used, the NFCC 108 may give credits to the DH 106 for any packets it discards without transmission and for which it had not yet sent a credit to the DH 106.

The electronic device 102 may perform NDEF RF interface 112 management. The Poll-side NDEF RF interface 112 may be used when the electronic device 102 operates as a reader/writer and the remote NFC endpoint 104 is an NFC Forum tag. NDEF RF interface 112 management operations may include discovery configuration; discovery and interface activation; and interface deactivation.

Discovery configuration parameters may be relevant, depending on the NFC technology used in discovery (NFC-A, NFC-B, or NFC-F as set by RF technology and mode in RF_DISCOVER_CMD). These parameters may be changed from defaults by using the CORE_SET_CONFIG_CMD command before moving to the state RFST_DISCOVERY. Within NCI version 1.1, Table 24 includes the discovery configuration parameters for Poll A, Table 25 includes the discovery configuration parameters for Poll B, Table 27 includes the discovery configuration parameters for Poll F and Table 28 includes the discovery configuration parameters for Poll ISO-DEP.

To enable a poll mode for the NDEF RF interface 112, the DH 106 may send the RF_DISCOVER_CMD message to the NFCC 108. The RF_DISCOVER_CMD message may include configurations with RF technology and mode values of NFC_A_PASSIVE_POLL_MODE, NFC_B_PASSIVE_POLL_MODE and/or NFC_F_PASSIVE_POLL_MODE. When the NFCC 108 has successfully completed protocol activation, the NFCC 108 may determine whether the remote NFC endpoint 104 is an NFC Forum tag. In one configuration, the NFCC 108 may determine that the remote NFC endpoint 104 is an NFC Forum tag if the remote NFC endpoint 104 at least follows the format and supports the commands as defined in the relevant tag operation specification. In this context, the remote NFC endpoint 104 may contain an NDEF message (which may be empty).

If the RF protocol is PROTOCOL_T1T, then the NFCC 108 may perform the following operations as defined in [T1TOP]: identification as NFC Forum Type 1 tag, version treatment and confirmation of presence of NDEF message 118 in Type 1 tag.

If the RF protocol is PROTOCOL_T2T, then the NFCC 108 may perform the following operations as defined in [T2TOP]: version treatment and NDEF detection procedure.

If the RF protocol is PROTOCOL_T3T, then the NFCC 108 may perform the following operations as defined in [T3TOP]: version treatment and the NDEF detection procedure.

If the RF protocol is PROTOCOL_ISO_DEP, then the NFCC 108 may perform the following operations as defined in [T4TOP]: version treatment and the NDEF detection procedure.

If the NFCC 108 detects the presence of an NDEF message 118 on the remote NFC endpoint 104, then the NFCC 108 may send an RF_INTF_ACTIVATED_NTF message to the DH 106 with the activation parameters defined as shown below in Table 7.

TABLE 7

| Parameter | Length | Description |
| --- | --- | --- |
| NFC Forum Tag Attributes Length | 1 Octet | Length of NFC Forum Tag Attributes Parameter (n) |
| NFC Forum Tag Attributes | n Octets | Attributes of the NFC Forum Tag. The number and meaning of the octets in this field depends on the RF Protocol. For PROTOCOL_T1T, the value of n SHALL be 3, and the parameter SHALL contain bytes 1-3 of the |

TABLE 7-continued

| Parameter | Length | Description |
|---|---|---|
| | | Capability Container as defined in [T1TOP] For PROTOCOL_T2T, the value of n SHALL be 3, and the parameter SHALL contain bytes 1-3 of the Capability Container as defined in [T2TOP] For PROTOCOL_T3T, the value of n SHALL be 14, and the parameter SHALL contain bytes 0-13 of the Attribute Information Format as defined in [T3TOP] For PROTOCOL_ISO_DEP, the value of n SHALL be 13, and the parameter SHALL contain bytes 2-14 of the Capability Container File as defined in [T4TOP] |
| NDEF message 118 Length | 2 Octets | Number of bytes in the NDEF message 118 on the tag, expressed as a number in the range 0x0000 to 0xFFFE regardless of the format used by the tag itself. |

When the DH 106 receives the RF_INTF_ACTIVATED_NTF message, the DH 106 may determine the current state of the tag based on the NDEF message 118 length and the DH 106 may determine the NFC Forum Tag attributes. If the NFCC 108 does not detect the presence of an NDEF message 118 on the remote NFC endpoint 104, the NFCC 108 may refrain from using the NDEF RF interface 112. Depending on the capabilities and the configuration of the NFCC 108, the NFCC 108 may instead use the ISO-DEP RF interface, the aggregated frame RF interface or the frame RF interface.

The deactivation cases for the Poll-side NDEF RF interface 112 are as described in Section 5.2 of the NCI version 1.1 for RFST_POLL_ACTIVE. The normal deactivation process is for the DH 106 to send an RF_DEACTIVATE_CMD to the NFCC 108, which then shuts down the tag gracefully. There are also error cases where communication has failed that are part of deactivation. In the error cases, the deactivation process may include an acknowledgement that deactivation has occurred.

If the NFCC 108 receives an NCI data message 116a that does not conform to the format described above, the NFCC 108 may send an NCI data message 116b with the descriptor field set to the value NDEF_OPERATION_INVALID, and no parameters. If an operation fails, and the NFCC 108 is able to determine that it is because the operation is not allowed given the current state of the tag, the NFCC 108 may send an NCI data message 116b with the descriptor field set to the value NDEF_OPERATION_DISALLOWED, and no parameters.

If an NDEF Put operation fails, and the NFCC 108 is able to determine that it is because there is not enough space on the tag, the NFCC 108 may send an NCI data message 116b with the descriptor field set to the value NDEF_OPERATION_OVERFLOW, and no parameters. If an operation fails, and the NFCC 108 is unable to determine the reason, the NFCC 108 may send an NCI data message 116b with the descriptor field set to the value NDEF_OPERATION_FAILED, and no parameters. If the NFCC 108 detects a transmission error, protocol error or timeout error, the NFCC 108 may retransmit the last command subject to the configured retry limit.

Figure 2:
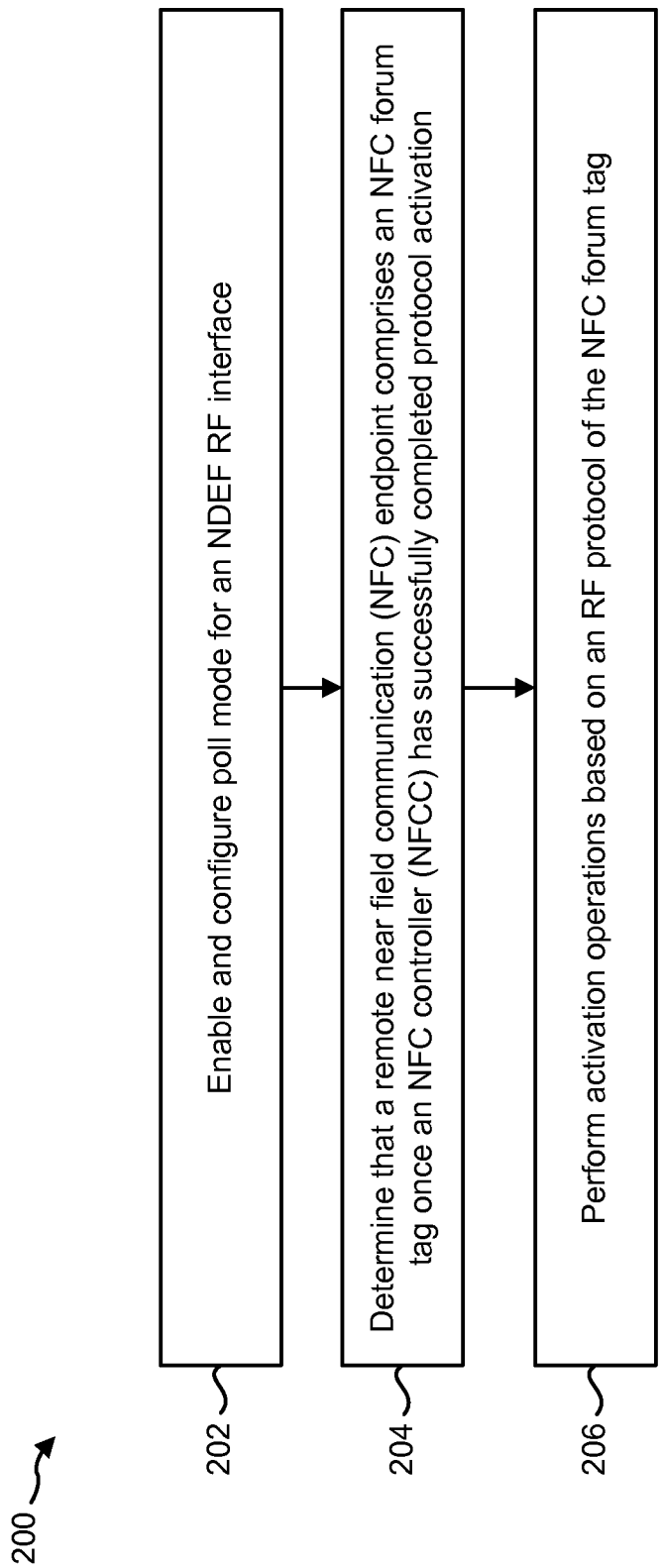
FIG. 2 is a flow diagram illustrating one configuration of a method for performing NDEF RF interface operations.

FIG. 2 is a flow diagram illustrating one configuration of a method 200 for performing NDEF RF interface 112 operations. The method 200 may be performed by an electronic device 102 that includes an NDEF RF interface 112. The electronic device 102 may interact with a remote NFC endpoint 104 using inductive communication. In one configuration, the inductive communication may be NFC. For example, the electronic device 102 may be an NFC forum device and the remote NFC endpoint 104 may be an NFC forum tag.

The NDEF RF interface 112 may provide for interaction between the NFC forum device and the NFC forum tag. The poll-side NDEF RF interface 112 may be used when the electronic device 102 operates as a reader/writer and the remote NFC endpoint 104 is an NFC forum tag. For example, the NDEF RF interface 112 may enable a device host (DH) 106 to read and write a complete NDEF message 118 in byte form.

The electronic device 102 may enable 202 and configure poll mode for an NDEF RF interface 112 configuration. For example, the DH 106 may send an RF_DISCOVER_CMD message to the NFCC 108. The RF_DISCOVER_CMD message may include configurations with RF technology and mode values of NFC_A_PASSIVE_POLL_MODE, NFC_B_PASSIVE_POLL_MODE and/or NFC_F_PASSIVE_POLL_MODE.

When the NFCC 108 has successfully completed protocol activation, the NFCC 108 may determine whether the remote NFC endpoint 104 is an NFC Forum tag.

The electronic device 102 may determine 204 that a remote near field communication (NFC) endpoint 104 comprises an NFC forum tag once an NFC controller (NFCC) 108 has successfully completed protocol activation. When the NFCC 108 has successfully completed protocol activation, the NFCC 108 may determine whether the remote NFC endpoint 104 is an NFC Forum tag.

The electronic device 102 may perform 206 activation operations based on an RF protocol of the NFC forum tag. For example, if the RF protocol is PROTOCOL_T1T, then the NFCC 108 may perform identification as NFC Forum Type 1 tag, version treatment and confirmation of presence of NDEF message 118 in Type 1 tag. If the RF protocol is PROTOCOL_T2T, then the NFCC 108 may perform version treatment and an NDEF detection procedure. If the RF protocol is PROTOCOL_T3T, then the NFCC 108 may perform version treatment and the NDEF detection procedure. If the RF protocol is PROTOCOL_ISO_DEP, then the NFCC 108 may perform version treatment and the NDEF detection procedure.

Figure 3:
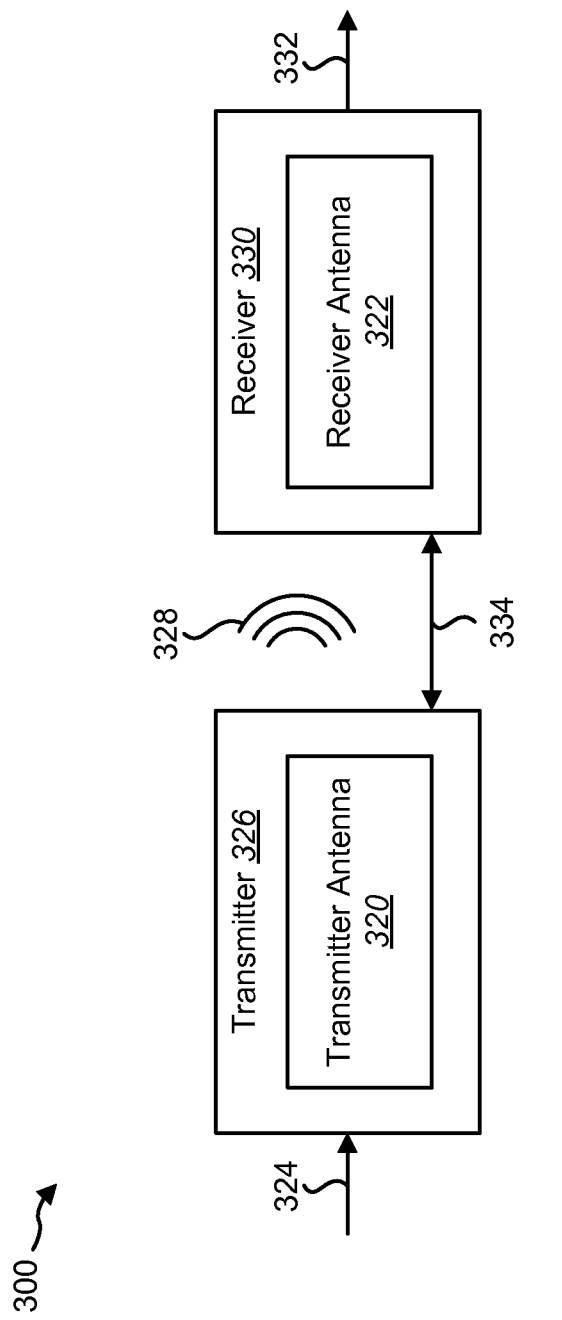
FIG. 3 is a block diagram illustrating one configuration of inductive communication in a wireless communication system.

FIG. 3 is a block diagram illustrating one configuration of inductive communication in a wireless communication system 300. In one configuration, the inductive communication may be near-field communication (NFC).

Input power 324 is provided to a transmitter 326 for generating a radiated field 328 for providing energy transfer. A receiver 330 couples to the radiated field 328 and generates an output power 332 for storing or consumption by a device (not shown) coupled to the output power 332. Both the transmitter 326 and the receiver 330 are separated by a distance 334. In one exemplary configuration, the transmitter 326 and receiver 330 are configured according to a mutual resonant relationship, such that when the resonant frequency of the receiver 330 and the resonant frequency of transmitter 326 are very close, transmission losses between the transmitter 326 and the receiver 330 are minimal when the receiver 330 is located in the "near-field" of the radiated field 328.

The transmitter 326 further includes a transmit antenna 320 for providing a means for energy transmission and the receiver 330 further includes a receive antenna 322 for providing a means for energy reception. An efficient energy transfer may occur by coupling a large portion of the energy in the near-field of the transmitting antenna 320 to a receiving antenna 322 rather than propagating most of the energy in an electromagnetic wave to the far field. When in this near-field, a coupling mode may be developed between the transmit antenna 320 and the receive antenna 322. The area around the transmit antenna 320 and the receive antenna 322 where this near-field coupling may occur is referred to as a coupling-mode region.

Figure 4:
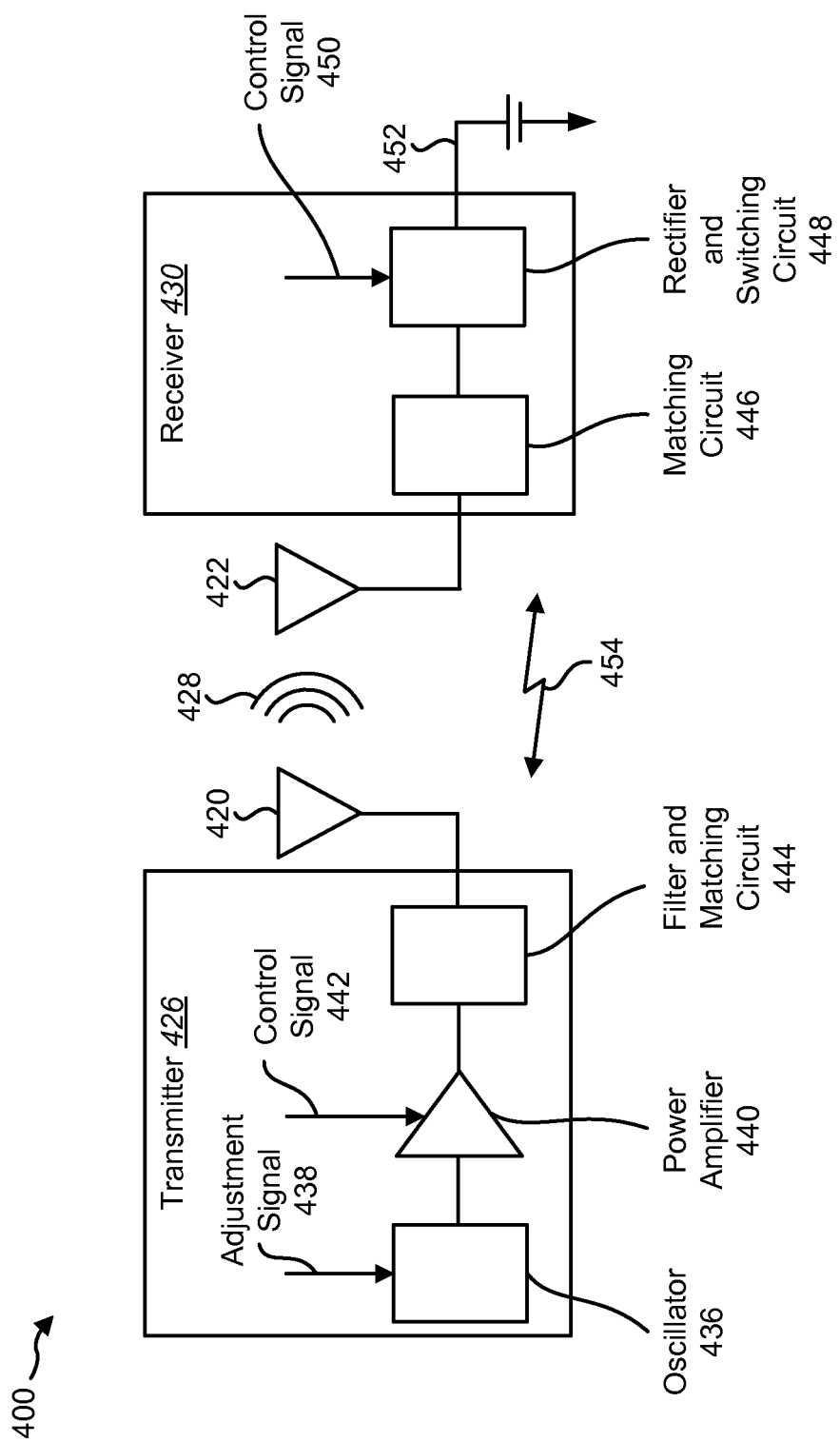
FIG. 4 is a simplified schematic diagram of a near-field wireless communication system.

FIG. 4 is a simplified schematic diagram of a near-field wireless communication system 400. The transmitter 426 includes an oscillator 436, a power amplifier 440 and a filter and matching circuit 444. The oscillator 436 is configured to generate a signal at a desired frequency, which may be adjusted in response to an adjustment signal 438. The oscillator 436 signal may be amplified by the power amplifier 440 with an amplification amount responsive to a control signal 442. The filter and matching circuit 444 may be included to filter out harmonics or other unwanted frequencies and match the impedance of the transmitter 426 to the transmit antenna 420. The transmit antenna may transmit a radiated field 428.

The receiver 430 may include a matching circuit 446 and a rectifier and switching circuit 448 to generate a DC power output 452 to charge a battery or power a device coupled to the receiver (not shown). The matching circuit 446 may be included to match the impedance of the receiver 430 to the receive antenna 422. The rectifier switching circuit 448 may be adjusted by a control signal 450. The receiver 430 and transmitter 426 may communicate on a separate communication channel 454 (e.g., Bluetooth, zigbee, cellular, etc.).

Figure 5:
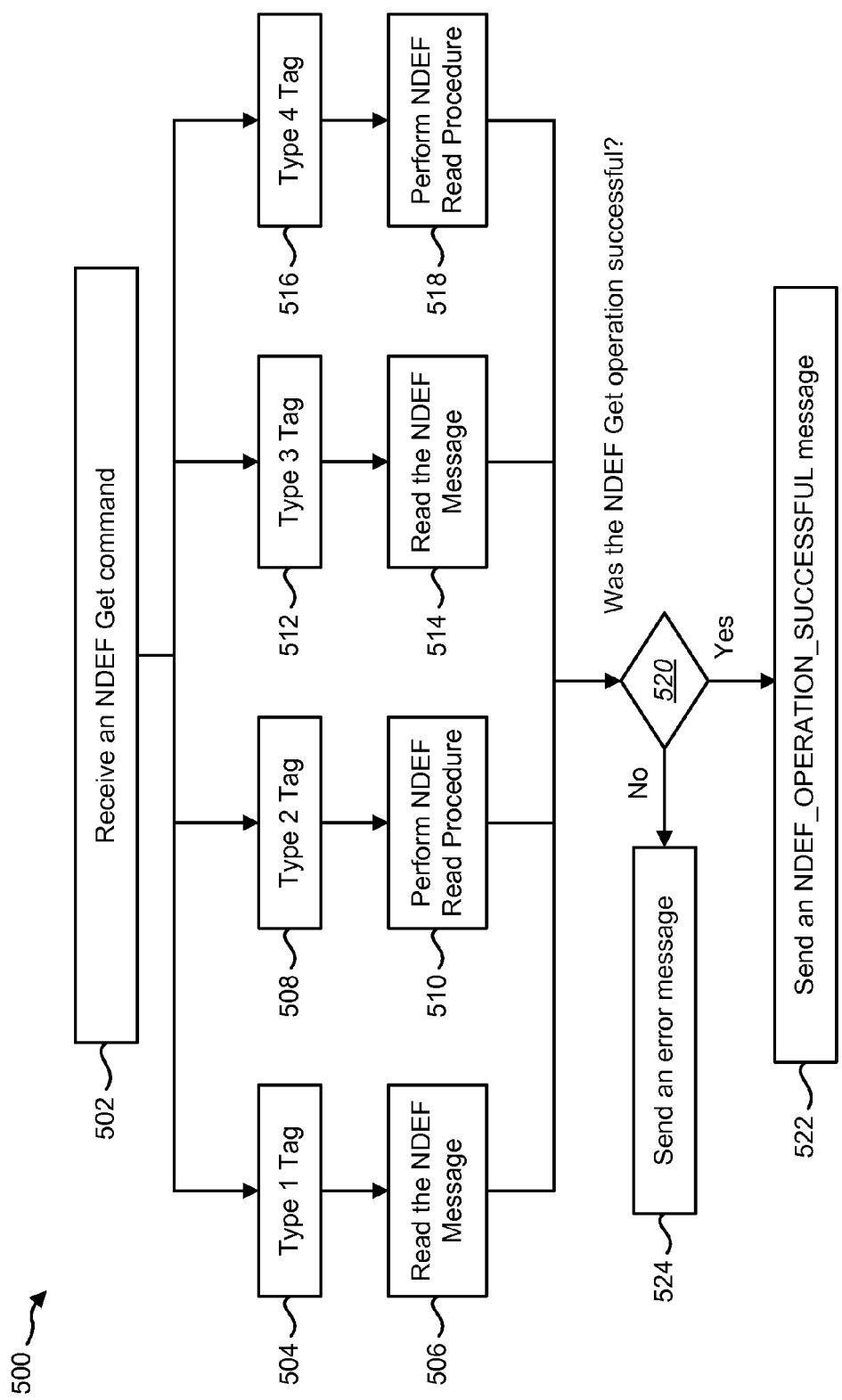
FIG. 5 is a flow diagram illustrating one configuration of a method for performing an NDEF get operation.

FIG. 5 is a flow diagram illustrating one configuration of a method 500 for performing an NDEF get operation. The method 500 may be performed by an NFC controller (NFCC) 108 of an electronic device 102. The NFCC 108 may interact with a device host (DH) 106 using an NDEF RF interface 112. The electronic device 102 may interact with a remote NFC endpoint 104 using NFC. The NDEF get operation may be used to retrieve a complete NDEF message 118 from the remote NFC device 104.

The NFCC 108 may receive 502 an NDEF get command. For example, the DH 106 may send an NDEF get command if it is determined that the operation is allowed by the current state of the remote NFC endpoint 104. The DH 106 may send an NCI data message 116a with the descriptor field set to the value NDEF_OPERATION_GET and with no parameters.

If the NFCC 108 determines 504 that the remote NFC device 104 is a type 1 tag, then the NFCC 108 may read 506 the NDEF message 118. This may be accomplished as defined in [T1TOP].

If the NFCC 108 determines 508 that the remote NFC device 104 is a type 2 tag, then the NFCC 108 may perform 510 an NDEF read procedure. This may be accomplished as defined in [T2TOP].

If the NFCC 108 determines 512 that the remote NFC device 104 is a type 3 tag, then the NFCC 108 may read 514 the NDEF message 118. This may be accomplished as defined in [T3TOP].

If the NFCC 108 determines 516 that the remote NFC device 104 is a type 4 tag, then the NFCC 108 may perform 518 an NDEF read procedure. This may be accomplished as defined in [T4TOP].

The NFCC 108 may determine 520 whether the NDEF get operation was successful. If the NDEF get operation was successful, then the NFCC 108 may send 522 an NDEF_OPERATION_SUCCEEDED message. In one configuration, the NFCC 108 may send an NCI data message 116b with the descriptor field set to the value of NDEF_OPERATION_SUCCEEDED, followed by a single parameter that represents the complete NDEF message 118 from the tag as a sequence of bytes.

If the NFCC 108 determines 520 that the NDEF get operation was not successful, the NFCC may send 524 an error message to the device host 106. This may be accomplished as described in connection with FIG. 10.

Figure 6:
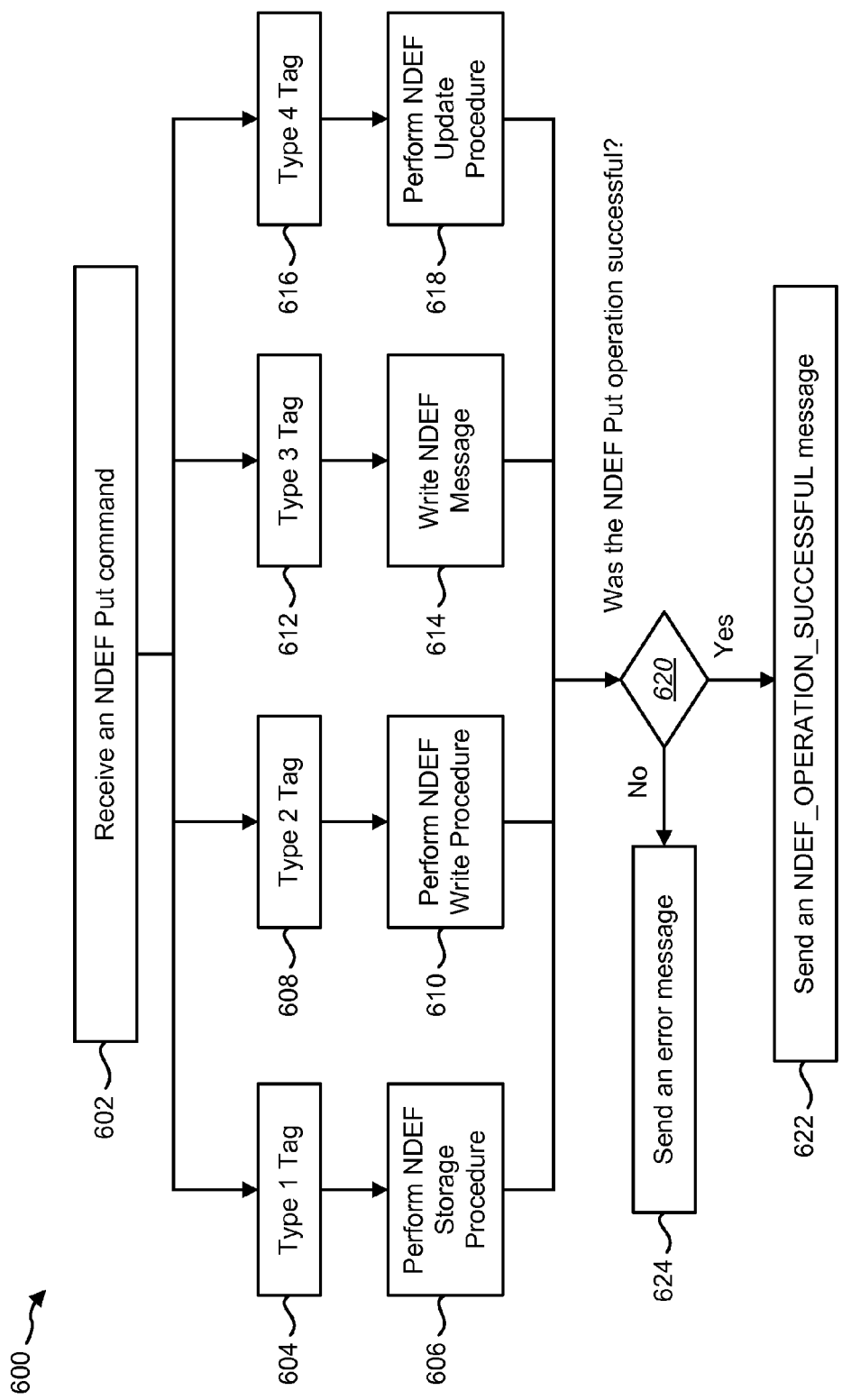
FIG. 6 is a flow diagram illustrating one configuration of a method for performing an NDEF put operation.

FIG. 6 is a flow diagram illustrating one configuration of a method 600 for performing an NDEF put operation. The method 600 may be performed by an NFC controller (NFCC) 108 of an electronic device 102. The NFCC 108 may interact with a device host (DH) 106 using an NDEF RF interface 112. The electronic device 102 may interact with a remote NFC endpoint 104 using NFC. The NDEF put command may be used to store a complete NDEF message 118 on the remote NFC device 104.

The NFCC 108 may receive 602 an NDEF put command. For example, the DH 106 may send an NDEF put command if it is determined that the operation is allowed by the current state of the remote NFC endpoint 104. The DH 106 may send an NCI data message 116a with the descriptor field set to the value NDEF_OPERATION_PUT followed by a single parameter that represents the complete NDEF message 118 as a sequence of bytes.

If the NFCC 108 determines 604 that the remote NFC device 104 is a type 1 tag, then the NFCC 108 may perform 606 NDEF storage operations. This may be accomplished as defined in [T1TOP].

If the NFCC 108 determines 608 that the remote NFC device 104 is a type 2 tag, then the NFCC 108 may perform 610 NDEF write procedure operations. This may be accomplished as defined in [T2TOP].

If the NFCC 108 determines 612 that the remote NFC device 104 is a type 3 tag, then the NFCC 108 may perform 614 write NDEF message 118 operations. This may be accomplished as defined in [T3TOP].

If the NFCC 108 determines 616 that the remote NFC device 104 is a type 4 tag, then the NFCC 108 may perform 618 NDEF update procedure operations. This may be accomplished as defined in [T4TOP].

The NFCC 108 may determine 620 whether the NDEF put operation was successful. If the NDEF put operation was successful, then the NFCC 108 may send 622 an NDEF_OPERATION_SUCCEEDED message. In one configuration, the NFCC 108 may send an NCI data message 116b with the descriptor field set to the value of NDEF_OPERATION_SUCCEEDED and no parameters. On receiving this NCI data message 116b, the device host 106 may determine the current state of the tag, if the tag has changed.

If the NFCC 108 determines 620 that the NDEF put operation was not successful, the NFCC may send 624 an error message to the device host 106. This may be accomplished as described in connection with FIG. 10.

Figure 7:
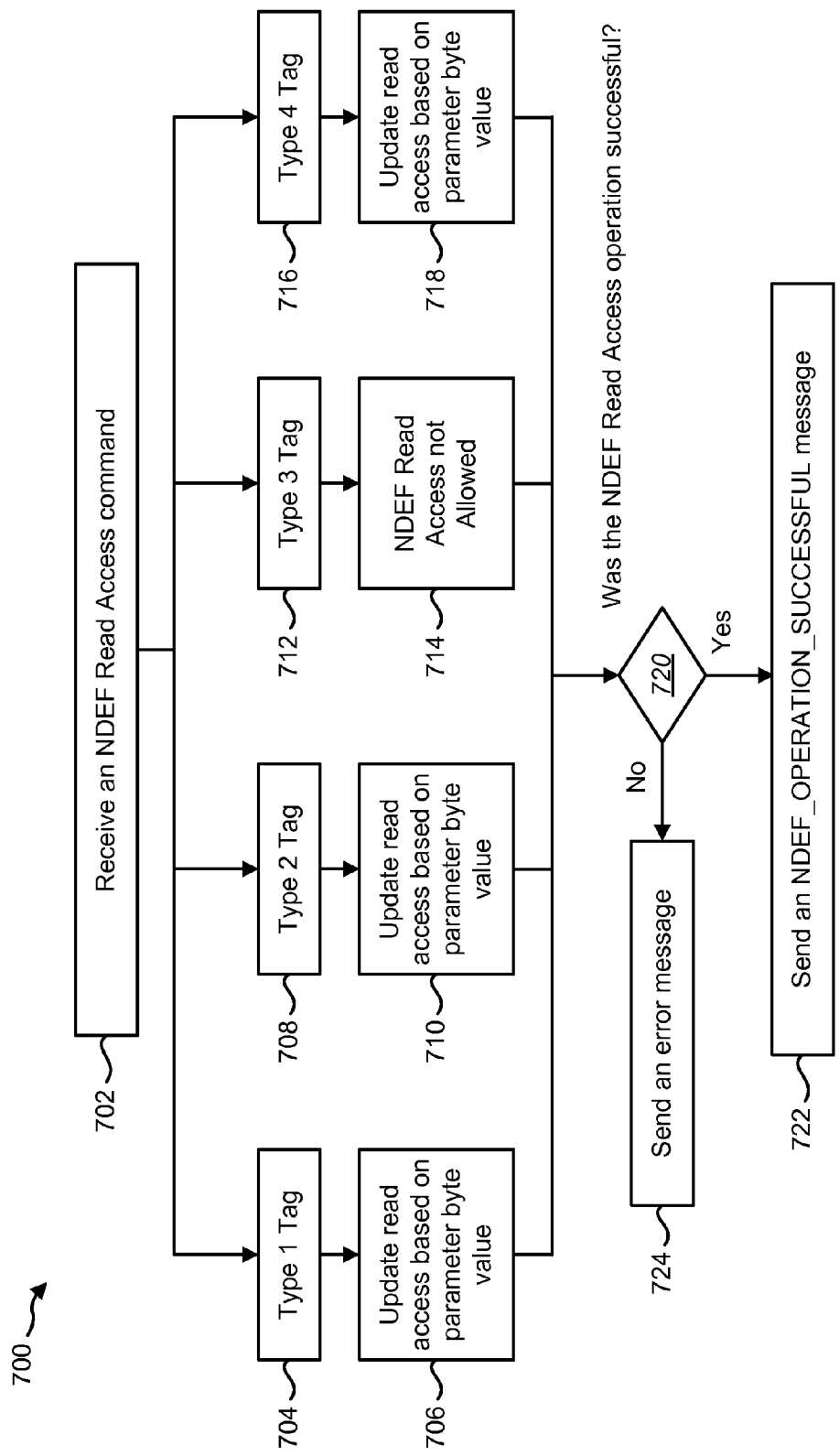
FIG. 7 is a flow diagram illustrating one configuration of a method for performing an NDEF read access operation.

FIG. 7 is a flow diagram illustrating one configuration of a method 700 for performing an NDEF read access operation. The method 700 may be performed by an NFC controller (NFCC) 108 of an electronic device 102. The NFCC 108 may interact with a device host (DH) 106 using an NDEF RF interface 112. The electronic device 102 may interact with a remote NFC endpoint 104 using NFC. The NDEF read access procedure may be used to change the read access for the NDEF message 118 on the remote NFC endpoint 104.

The NFCC 108 may receive 702 an NDEF read access command. For example, the DH 106 may send an NDEF read access command if it is determined that the operation is allowed by the current state of the remote NFC endpoint 104. The DH 106 may send an NCI data message 116*a* with the descriptor field set to the value NDEF_OPERATION_READ_ACCESS, followed by a single one-byte parameter that includes the new read access capability.

If the NFCC 108 determines 704 that the remote NFC device 104 is a type 1 tag, then the NFCC 108 may update 706 the read access of the remote NFC endpoint 104 based on the parameter byte value. For example, the NFCC 108 may use Type 1 tag commands to replace the most significant nibble of byte 3 of the capability container, as defined in [T1TOP], with the 4 least significant bits of the value of the parameter byte.

If the NFCC 108 determines 708 that the remote NFC device 104 is a type 2 tag, then the NFCC 108 may update 710 the read access of the remote NFC endpoint 104 based on the parameter byte value. For example, the NFCC 108 may use Type 2 tag commands to replace the most significant nibble of byte 3 of the capability container, as defined in [T2TOP], with the 4 least significant bits of the value of the parameter byte.

If the NFCC 108 determines 712 that the remote NFC device 104 is a type 3 tag, then NDEF read access is not allowed 714.

If the NFCC 108 determines 716 that the remote NFC device 104 is a type 4 tag, then the NFCC 108 may update 718 the read access of the remote NFC endpoint 104 based on the parameter byte value. For example, the NFCC 108 may use Type 4 tag commands to replace an NDEF file read access condition byte of the NDEF file control TLV, as defined in [T4TOP], with the value of the parameter byte.

The NFCC 108 may determine 720 whether the NDEF read access operation was successful. If the NDEF read access operation was successful, then the NFCC 108 may send 722 an NDEF_OPERATION_SUCCEEDED message. In one configuration, the NFCC 108 may send an NCI data message 116*b* with the descriptor field set to the value of NDEF_OPERATION_SUCCEEDED and no parameters. On receiving this NCI data message 116*b*, the device host 106 may determine the current state of the tag, if the tag has changed.

If the NFCC 108 determines 720 that the NDEF read access operation was not successful, the NFCC may send 724 an error message to the device host 106. This may be accomplished as described in connection with FIG. 10.

Figure 8:
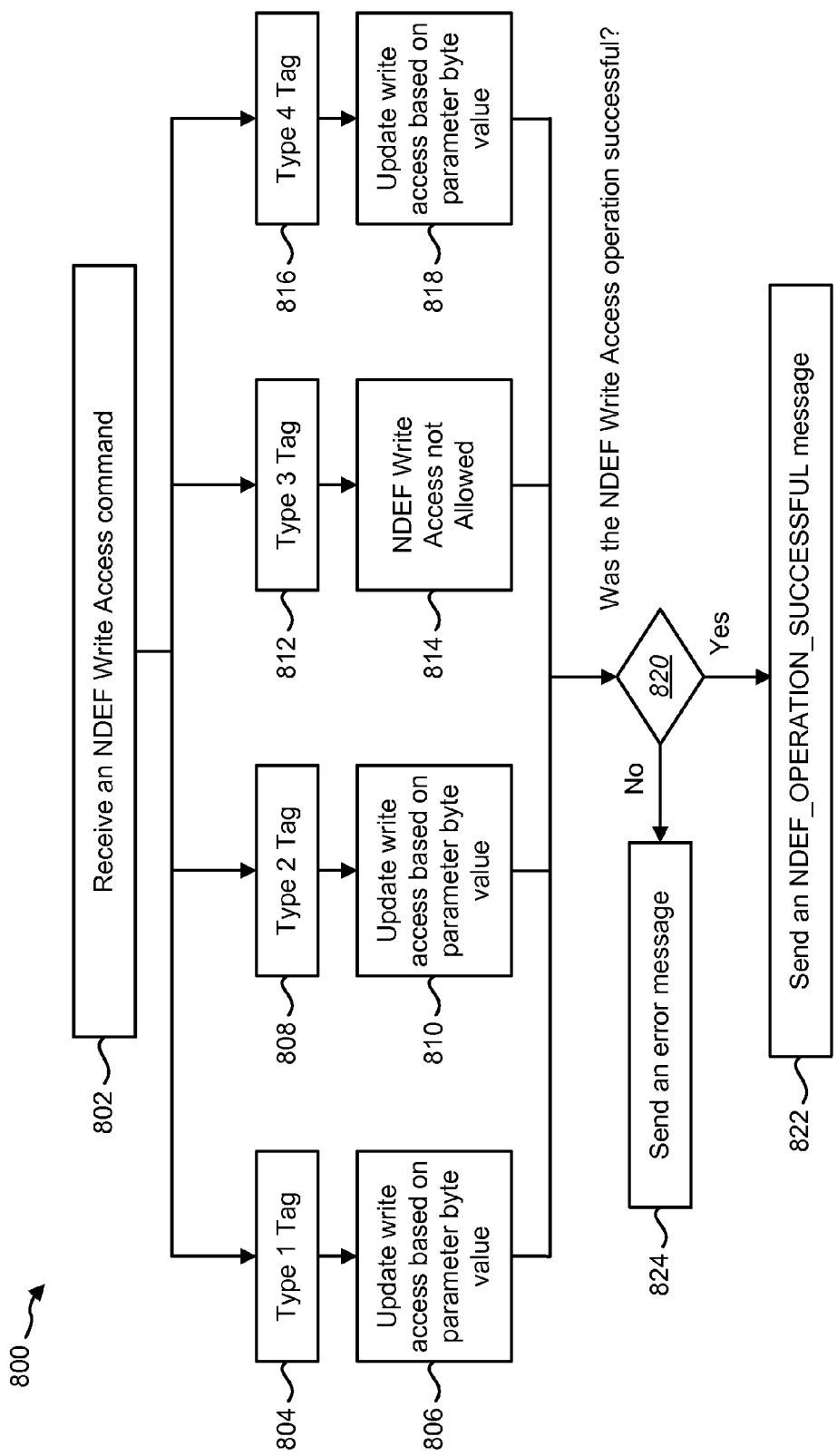
FIG. 8 is a flow diagram illustrating one configuration of a method for performing an NDEF write access operation.

FIG. 8 is a flow diagram illustrating one configuration of a method 800 for performing an NDEF write access operation. The method 800 may be performed by an NFC controller (NFCC) 108 of an electronic device 102. The NFCC 108 may interact with a device host (DH) 106 using an NDEF RF interface 112. The electronic device 102 may interact with a remote NFC endpoint 104 using NFC. The NDEF write access procedure may be used to change the write access for the NDEF message 118 on the remote NFC endpoint 104.

The NFCC 108 may receive 802 an NDEF write access command. For example, the DH 106 may send an NDEF write access command if it is determined that the operation is allowed by the current state of the remote NFC endpoint 104. The DH 106 may send an NCI data message 116*a* with the descriptor field set to the value NDEF_OPERATION_WRITE_ACCESS, followed by a single one-byte parameter that contains the new write access capability.

If the NFCC 108 determines 804 that the remote NFC device 104 is a type 1 tag, then the NFCC 108 may update 806 the write access of the remote NFC endpoint 104 based on the parameter byte value. For example, the NFCC 108 may use Type 1 tag commands to replace the least significant nibble of byte 3 of the capability container, as defined in [T1TOP], with the 4 least significant bits of the value of the parameter byte.

If the NFCC 108 determines 808 that the remote NFC device 104 is a type 2 tag, then the NFCC 108 may update 810 the write access of the remote NFC endpoint 104 based on the parameter byte value. For example, the NFCC 108 may use Type 2 tag commands to replace the least significant nibble of byte 3 of the capability container, as defined in [T2TOP], with the 4 least significant bits of the value of the parameter byte.

If the NFCC 108 determines 812 that the remote NFC device 104 is a type 3 tag, then NDEF write access is not allowed 814.

If the NFCC 108 determines 816 that the remote NFC device 104 is a type 4 tag, then the NFCC 108 may update 818 the write access of the remote NFC endpoint 104 based on the parameter byte value. For example, the NFCC 108 may use Type 4 tag commands to replace the NDEF file write access condition byte of the NDEF file control TLV, as defined in [T4TOP], with the value of the parameter byte.

The NFCC 108 may determine 820 whether the NDEF write access operation was successful. If the NDEF write access operation was successful, then the NFCC 108 may send 822 an NDEF_OPERATION_SUCCEEDED message. In one configuration, the NFCC 108 may send an NCI data message 116*b* with the descriptor field set to the value of NDEF_OPERATION_SUCCEEDED and no parameters. On receiving this NCI data message 116*b*, the device host 106 may determine the current state of the tag, if the tag has changed.

If the NFCC 108 determines 820 that the NDEF write access operation was not successful, the NFCC may send 824 an error message to the device host 106. This may be accomplished as described in connection with FIG. 10.

Figure 9:
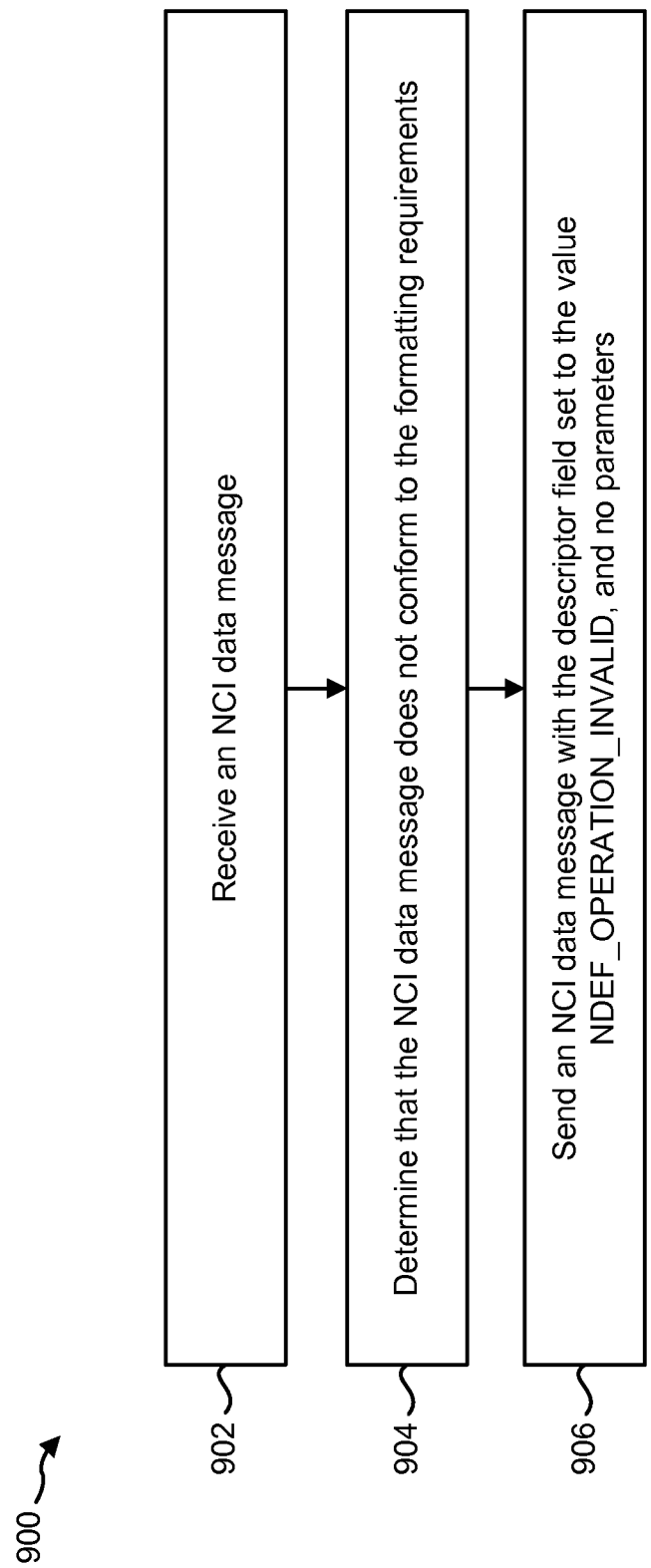
FIG. 9 is a flow diagram illustrating one configuration of a method for performing error handling for an NDEF operation.

FIG. 9 is a flow diagram illustrating one configuration of a method 900 for performing error handling for an NDEF operation. The method 900 may be performed by an NFC controller (NFCC) 108 of an electronic device 102. The NFCC 108 may interact with a device host (DH) 106 using an NDEF RF interface 112.

The NFCC 108 may receive 902 an NCI data message 116*a*. For example, the NFCC 108 may receive 902 the NCI data message 116*a* from the DH 106 as part of an NDEF operation (e.g., get, put, read access, write access, etc.).

The NFCC 108 may determine 904 that the NCI data message 116*a* does not conform to formatting requirements. For example, the NFCC 108 may determine 904 that the NCI data message 116*a* does not conform to the NCI data message formatting described in connection with Tables 1-3 above.

The NFCC 108 may send 906 an NCI data message 116*b* with the descriptor field set to the value NDEF_OPERATION_INVALID, and no parameters. The NFCC 108 may send 906 the NCI data message 116*b* to the DH 106.

Figure 10:
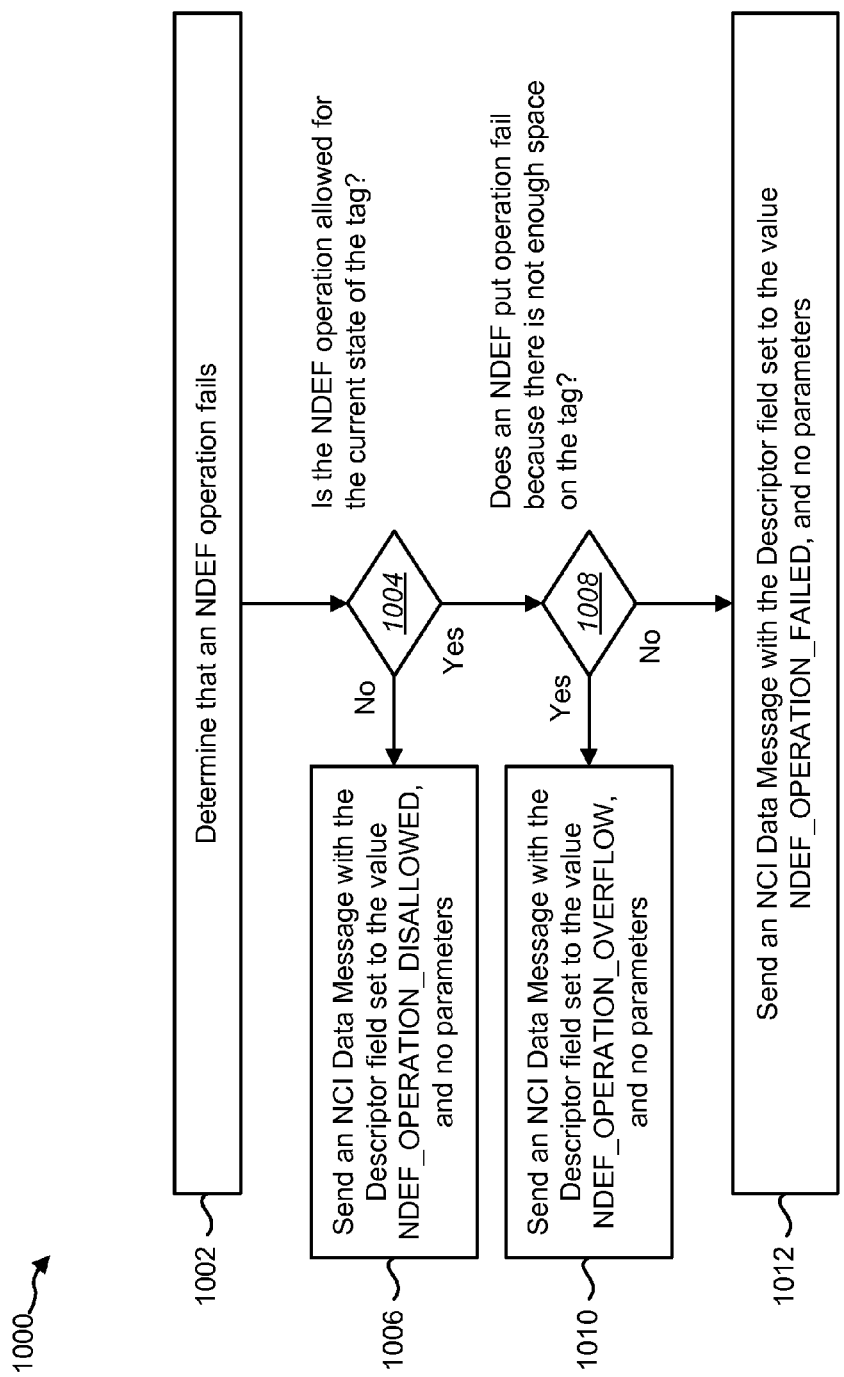
FIG. 10 is a flow diagram illustrating another configuration of a method for performing error handling for an NDEF operation.

FIG. 10 is a flow diagram illustrating another configuration of a method 1000 for performing error handling for an NDEF operation. The method 1000 may be performed by an NFC controller (NFCC) 108 of an electronic device 102. The NFCC 108 may interact with a device host (DH) 106 using an NDEF RF interface 112. The NFCC 108 may determine 1002 that an NDEF operation (e.g., get, put, read access, write access, etc.) fails.

The NFCC 108 may determine 1004 whether the NDEF operation is allowed for the current state of the tag (e.g., the remote NFC endpoint 104). If the NFCC 108 is able to determine 1004 that the NDEF operation is not allowed given the current state of the tag, the NFCC 108 may send 1006 an NCI data message 116b to the DH 106 with the descriptor field set to the value NDEF_OPERATION_DISALLOWED, and no parameters.

If the NFCC 108 determines 1004 that the NDEF operation is allowed for the current state of the tag, then the NFCC 108 may determine 1008 whether an NDEF put operation fails because there is not enough space on the tag. If this is the reason for the NDEF operation failure, the NFCC 108 may send 1010 an NCI data message 116b to the DH 106 with the descriptor field set to the value NDEF_OPERATION_OVERFLOW, and no parameters.

If the NDEF operation fails, and the NFCC 108 is unable to determine the reason, the NFCC 108 may send 1012 an NCI data message 116b to the DH 106 with the descriptor field set to the value NDEF_OPERATION_FAILED, and no parameters.

Figure 11:
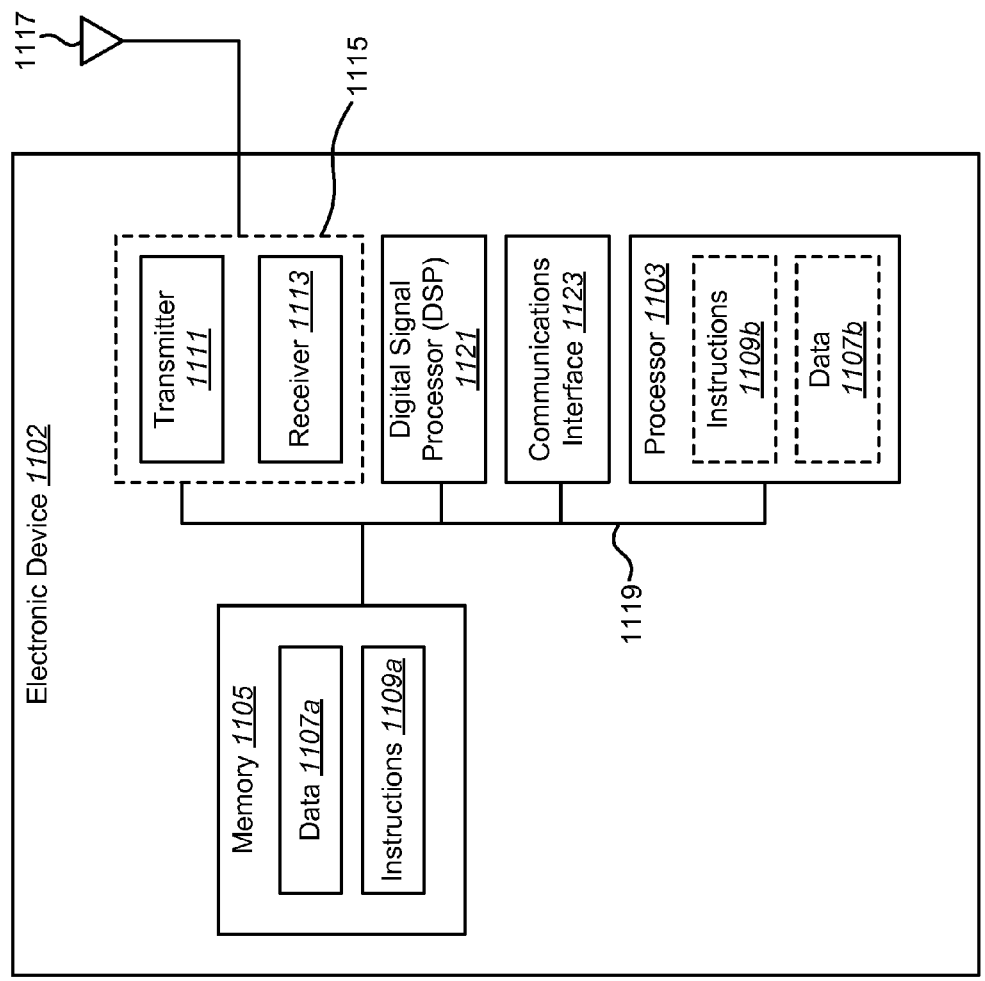
FIG. 11 illustrates certain components that may be included within an electronic device.

FIG. 11 illustrates certain components that may be included within an electronic device 1102. The electronic device 1102 may be an access terminal, a mobile station, a user equipment (UE), etc. For example, the electronic device 1102 may be the electronic device 102 of FIG. 1.

The electronic device 1102 includes a processor 1103. The processor 1103 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1103 may be referred to as a central processing unit (CPU). Although just a single processor 1103 is shown in the electronic device 1102 of FIG. 11, in an alternative configuration, a combination of processors (e.g., an ARM and DSP) could be used.

The electronic device 1102 also includes memory 1105 in electronic communication with the processor (i.e., the processor can read information from and/or write information to the memory). The memory 1105 may be any electronic component capable of storing electronic information. The memory 1105 may be configured as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1107a and instructions 1109a may be stored in the memory 1105. The instructions may include one or more programs, routines, sub-routines, functions, procedures, code, etc. The instructions may include a single computer-readable statement or many computer-readable statements. The instructions 1109a may be executable by the processor 1103 to implement the methods disclosed herein. Executing the instructions 1109a may involve the use of the data 1107a that is stored in the memory 1105. When the processor 1103 executes the instructions 1109, various portions of the instructions 1109b may be loaded onto the processor 1103, and various pieces of data 1107b may be loaded onto the processor 1103.

The electronic device 1102 may also include a transmitter 1111 and a receiver 1113 to allow transmission and reception of signals to and from the electronic device 1102 via an antenna 1117. The transmitter 1111 and receiver 1113 may be collectively referred to as a transceiver 1115. The electronic device 1102 may also include (not shown) multiple transmitters, multiple antennas, multiple receivers and/or multiple transceivers.

The electronic device 1102 may include a digital signal processor (DSP) 1121. The electronic device 1102 may also include a communications interface 1123. The communications interface 1123 may allow a user to interact with the electronic device 1102.

The various components of the electronic device 1102 may be coupled together by one or more buses, which may include a power bus, a control signal bus, a status signal bus, a data bus, etc. For the sake of clarity, the various buses are illustrated in FIG. 11 as a bus system 1119.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2 and FIGS. 5-10, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method, comprising:
    enabling and configuring poll mode for a near field communication (NFC) data exchange format (NDEF) radio frequency (RF) interface configuration that enables an NFC controller (NFCC) of an electronic device to interact with a device host (DH) of the electronic device, wherein the DH sends an RF_DISCOVER_CMD message to the NFCC to enable poll mode for the NDEF RF interface, and wherein the RF_DISCOVER_CMD message comprises configurations with RF technology and mode values of at least one of NFC_A_PASSIVE_POLL_MODE, NFC_B_PASSIVE_POLL_MODE, and NFC_F_PASSIVE_POLL_MODE;
    determining that a remote NFC endpoint comprises an NFC forum tag once the NFCC has successfully completed protocol activation; and
    performing activation operations based on an RF protocol of the NFC forum tag.

2. The method of claim 1, wherein the NDEF RF interface defines linkage of operations to NFC forum type 1-4 tag operation specifications to perform transfers.

3. The method of claim 1, wherein if the RF protocol of the NFC forum tag is PROTOCOL_T1T, then performing activation operations comprises:
    identifying the NFC forum tag as an NFC forum type 1 tag;
    performing version treatment; and
    confirming the presence of an NDEF message in the NFC forum tag.

4. The method of claim 1, wherein if the RF protocol of the NFC forum tag is PROTOCOL_T2T, then performing activation operations comprises:
    performing version treatment; and
    performing an NDEF detection procedure.

5. The method of claim 1, wherein if the RF protocol of the NFC forum tag is PROTOCOL_T3T, then performing activation operations comprises:
    performing version treatment; and
    performing NDEF detection.

6. The method of claim 1, wherein if the RF protocol of the NFC forum tag is PROTOCOL_T4T, then performing activation operations comprises:
    performing version treatment; and
    performing an NDEF detection procedure.

7. The method of claim 1, further comprising:
    detecting the presence of an NDEF message on the remote NFC endpoint; and
    sending an RF_INTF_ACTIVATED_NTF message to the DH with activation parameters.

8. The method of claim 7, further comprising determining a current state of the NFC forum tag based on the NDEF message length and the NFC forum tag attributes when the DH receives the RF_INTF_ACTIVATED_NTF message.

9. The method of claim 1, further comprising retrieving a complete NDEF message from an NFC forum tag based on an NDEF get command.

10. The method of claim 1, further comprising storing a complete NDEF message on an NFC forum tag based on an NDEF put command.

11. The method of claim 1, further comprising changing read access for an NDEF message on the remote NFC endpoint based on an NDEF read access command.

12. The method of claim 1, further comprising changing write access for an NDEF message on the remote NFC endpoint based on an NDEF write access command.

13. The method of claim 12, further comprising refraining from using the NDEF RF interface when the presence of an NDEF message is not detected on the remote NFC endpoint.

14. The method of claim 13, wherein the DH elects to use one of an ISO-DEP RF interface, an aggregated frame RF interface and a frame RF interface.

15. The method of claim 1, further comprising sending an NFC forum controller interface (NCI) data message with a descriptor field set to a value of NDEF_OPERATION_INVALID and no parameters when the NFCC receives an NCI data message that does not conform to format requirements.

16. The method of claim 1, further comprising sending an NCI data message with a descriptor field set to a value of NDEF_OPERATION_DISALLOWED and no parameters when an NDEF operation fails and the NFCC is able to determine that the failure is because the NDEF operation is not allowed given a current state of the NFC forum tag.

17. The method of claim 1, further comprising sending an NCI data message with a descriptor field set to a value of NDEF_OPERATION_OVERFLOW and no parameters when an NDEF put operation fails and the NFCC is able to determine that the failure is due to not enough space on the NFC forum tag.

18. The method of claim 1, further comprising sending an NCI data message with a descriptor field set to a value of NDEF_OPERATION_FAILED and no parameters when an NDEF operation fails and the NFCC is unable to determine a reason for the failure.

19. The method of claim 1, wherein when the NFCC detects at least one of a transmission error, a protocol error and a timeout error, the NFCC retransmits the last command subject to a configured retry limit.

20. The method of claim 1, further comprising instructing the NFCC to read an existing NDEF message from the NFC forum tag.

21. The method of claim 1, further comprising instructing the NFCC to write a new NDEF message to the NFC forum tag.

22. The method of claim 1, wherein the method is performed by the electronic device, and wherein the electronic device comprises NFC functionality.

23. The method of claim 22, wherein the electronic device comprises the DH.

24. The method of claim 23, wherein the DH recognizes at least one of an NFC target device and an NFC tag when within range of a coverage area for NFC communication.

25. The method of claim 1, wherein the NDEF RF interface defines mechanisms by which access control for an NDEF message on the remote NFC endpoint can be changed.

26. The method of claim 1, wherein the NDEF RF interface defines a number of error scenarios and responses to these error scenarios.

27. An apparatus, comprising:
a processor;
memory in electronic communication with the processor; and
instructions stored in the memory, the instructions being executable by the processor to:
enable and configure poll mode for a near field communication (NFC) data exchange format (NDEF) radio frequency (RF) interface configuration that enables an NFC controller (NFCC) of an electronic device to interact with a device host (DH) of the electronic device, wherein the DH sends an RF_DISCOVER_CMD message to the NFCC to enable poll mode for the NDEF RF interface, and wherein the RF_DISCOVER_CMD message comprises configurations with RF technology and mode values of at least one of NFC_A_PASSIVE_POLL_MODE, NFC_B_PASSIVE_POLL_MODE, and NFC_F_PASSIVE_POLL_MODE;
determine that a remote NFC endpoint comprises an NFC forum tag once the NFCC has successfully completed protocol activation; and
perform activation operations based on an RF protocol of the NFC forum tag.

28. The apparatus of claim 27, further comprising instructions executable to retrieve a complete NDEF message from an NFC forum tag based on an NDEF get command.

29. The apparatus of claim 27, further comprising instructions executable to store a complete NDEF message on an NFC forum tag based on an NDEF put command.

30. The apparatus of claim 27, further comprising instructions executable to change read access for an NDEF message on the remote NFC endpoint based on an NDEF read access command.

31. The apparatus of claim 27, further comprising instructions executable to change write access for an NDEF message on the remote NFC endpoint based on an NDEF write access command.

32. The apparatus of claim 27, further comprising instructions executable to send an NFC forum controller interface (NCI) data message with a descriptor field set to a value of NDEF_OPERATION_INVALID and no parameters when the NFCC receives an NCI data message that does not conform to format requirements.

33. The apparatus of claim 27, further comprising instructions executable to send an NCI data message with a descriptor field set to a value of NDEF_OPERATION_DISALLOWED and no parameters when an NDEF operation fails and the NFCC is able to determine that the failure is because the NDEF operation is not allowed given a current state of the NFC forum tag.

34. The apparatus of claim 27, further comprising instructions executable to send an NCI data message with a descriptor field set to a value of NDEF_OPERATION_OVERFLOW and no parameters when an NDEF put operation fails and the NFCC is able to determine that the failure is due to not enough space on the NFC forum tag.

35. The apparatus of claim 27, further comprising instructions executable to send an NCI data message with the descriptor field set to a value of NDEF_OPERATION_FAILED and no parameters when an NDEF operation fails and the NFCC is unable to determine a reason for the failure.

36. An electronic device, comprising:
means for enabling and configuring poll mode for a near field communication (NFC) data exchange format (NDEF) radio frequency (RF) interface configuration that enables an NFC controller (NFCC) of the electronic device to interact with a device host (DH) of the electronic device, wherein the DH sends an RF_DISCOVER_CMD message to the NFCC to enable poll mode for the NDEF RF interface, and wherein the RF_DISCOVER_CMD message comprises configurations with RF technology and mode values of at least one of NFC_A_PASSIVE_POLL_MODE, NFC_B_PASSIVE_POLL_MODE, and NFC_F_PASSIVE_POLL_MODE;
means for determining that a remote NFC endpoint comprises an NFC forum tag once the NFCC has successfully completed protocol activation; and
means for performing activation operations based on an RF protocol of the NFC forum tag.

37. The electronic device of claim 36, further comprising means for retrieving a complete NDEF message from an NFC forum tag based on an NDEF get command.

38. The electronic device of claim 36, further comprising means for storing a complete NDEF message on an NFC forum tag based on an NDEF put command.

39. The electronic device of claim 36, further comprising means for changing read access for an NDEF message on the remote NFC endpoint based on an NDEF read access command.

40. The electronic device of claim 36, further comprising means for changing write access for an NDEF message on the remote NFC endpoint based on an NDEF write access command.

41. The electronic device of claim 36, further comprising means for sending an NFC forum controller interface (NCI) data message with a descriptor field set to a value of NDEF_OPERATION_INVALID and no parameters when the NFCC receives an NCI data message that does not conform to format requirements.

42. The electronic device of claim 36, further comprising means for sending an NCI data message with a descriptor field set to a value of NDEF_OPERATION_DISALLOWED and no parameters when an NDEF operation fails and the NFCC is able to determine that the failure is because the NDEF operation is not allowed given a current state of the NFC forum tag.

43. The electronic device of claim 36, further comprising means for sending an NCI data message with a descriptor field set to a value of NDEF_OPERATION_OVERFLOW and no parameters when an NDEF put operation fails and the NFCC is able to determine that the failure is due to not enough space on the NFC forum tag.

44. The electronic device of claim 36, further comprising means for sending an NCI data message with a descriptor field set to a value of NDEF_OPERATION_FAILED and no parameters when an NDEF operation fails and the NFCC is unable to determine a reason for the failure.

45. A computer-program product, comprising a non-transitory tangible computer-readable medium having instructions thereon, the instructions comprising:
   code for causing an electronic device to enable and configure poll mode for a near field communication (NFC) data exchange format (NDEF) radio frequency (RF) interface configuration that enables an NFC controller (NFCC) of the electronic device to interact with a device host (DH) of the electronic device, wherein the DH sends an RF_DISCOVER_CMD message to the NFCC to enable poll mode for the NDEF RF interface, and wherein the RF_DISCOVER_CMD message comprises configurations with RF technology and mode values of at least one of NFC_A_PASSIVE_POLL_MODE, NFC_B_PASSIVE_POLL_MODE, and NFC_F_PASSIVE_POLL_MODE;
   code for causing the electronic device to determine that a remote NFC endpoint comprises an NFC forum tag once the NFCC has successfully completed protocol activation; and
   code for causing the electronic device to perform activation operations based on an RF protocol of the NFC forum tag.

46. The computer-program product of claim 45, further comprising code for causing the electronic device to retrieve a complete NDEF message from an NFC forum tag based on an NDEF get command.

47. The computer-program product of claim 45, further comprising code for causing the electronic device to store a complete NDEF message on an NFC forum tag based on an NDEF put command.

48. The computer-program product of claim 45, further comprising code for causing the electronic device to change read access for an NDEF message on the remote NFC endpoint based on an NDEF read access command.

49. The computer-program product of claim 45, further comprising code for causing the electronic device to change write access for an NDEF message on the remote NFC endpoint based on an NDEF write access command.

50. The computer-program product of claim 45, further comprising code for causing the electronic device to send an NFC forum controller interface (NCI) data message with a descriptor field set to a value of NDEF_OPERATION_INVALID and no parameters when the NFCC receives an NCI data message that does not conform to format requirements.

51. The computer-program product of claim 45, further comprising code for causing the electronic device to send an NCI data message with a descriptor field set to a value of NDEF_OPERATION_DISALLOWED and no parameters when an NDEF operation fails and the NFCC is able to determine that the failure is because the NDEF operation is not allowed given the current state of the NFC forum tag.

52. The computer-program product of claim 45, further comprising code for causing the electronic device to send an NCI data message with a descriptor field set to a value of NDEF_OPERATION_OVERFLOW and no parameters when an NDEF put operation fails and the NFCC is able to determine that the failure is due to not enough space on the NFC forum tag.

53. The computer-program product of claim 45, further comprising code for causing the electronic device to send an NCI data message with a descriptor field set to a value of NDEF_OPERATION_FAILED and no parameters when an NDEF operation fails and the NFCC is unable to determine a reason for the failure.

* * * * *